(12) United States Patent
Yang et al.

(10) Patent No.: US 11,096,034 B1
(45) Date of Patent: Aug. 17, 2021

(54) SYSTEMS AND METHODS FOR EMPHASIZING AND DEEMPHASIZING RADIO BEAMS FROM BASE STATIONS

(71) Applicant: Verizon Patent and Licensing Inc., Basking Ridge, NJ (US)

(72) Inventors: Jin Yang, Orinda, CA (US); Ratul K. Guha, Warwick, PA (US); Krishna K. Bellamkonda, Roanoke, TX (US); Krishnamurthy Sreenath, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/947,781

(22) Filed: Aug. 17, 2020

(51) Int. Cl.
| | |
|---|---|
| *H04W 8/00* | (2009.01) |
| *H04B 7/185* | (2006.01) |
| *H04W 4/021* | (2018.01) |
| *H04W 52/24* | (2009.01) |
| *H04W 24/02* | (2009.01) |
| *H04W 16/28* | (2009.01) |

(52) U.S. Cl.
CPC ........ *H04W 8/005* (2013.01); *H04B 7/18513* (2013.01); *H04W 4/021* (2013.01); *H04W 16/28* (2013.01); *H04W 24/02* (2013.01); *H04W 52/243* (2013.01)

(58) Field of Classification Search
CPC ..... H04W 4/021; H04W 8/005; H04W 16/14; H04W 16/28; H04W 24/02; H04W 52/243; H04B 7/18513; B64G 1/1021
See application file for complete search history.

(56) References Cited

U.S. PATENT DOCUMENTS

| | | | |
|---|---|---|---|
| 2012/0082052 A1* | 4/2012 | Oteri ..................... | H04W 24/10 |
| | | | 370/252 |
| 2017/0272131 A1* | 9/2017 | Ananth ............... | H04W 72/082 |
| 2018/0213486 A1* | 7/2018 | Yoo ..................... | H04W 52/248 |
| 2020/0045572 A1* | 2/2020 | Yum .................... | H04W 52/243 |
| 2020/0260358 A1* | 8/2020 | Ratnam ................. | H04B 7/024 |
| 2021/0003702 A1* | 1/2021 | Weiner ................. | G01S 19/425 |
| 2021/0058146 A1* | 2/2021 | Eichen ............... | H04B 7/18513 |

* cited by examiner

*Primary Examiner* — Raymond S Dean

(57) ABSTRACT

A device may receive data identifying user devices within a geographical area of a base station, respective services provided by the base station to the user devices, the geographical area, an earth station within the geographical area, an infrastructure within the geographical area, and other base stations located geographically adjacent to the geographical area. The device may determine, based on the received data, interfering beams of the base station that interfere with the earth station, and may include data identifying the interfering beams, in a first list of beams to be deemphasized. The device may determine, based on the received data, beams of the base station to be emphasized based on the infrastructure, and may include data identifying the beams to be emphasized, in a second list. The device may control the base station based on the first list and the second list.

20 Claims, 10 Drawing Sheets

SYSTEMS AND METHODS FOR EMPHASIZING AND DEEMPHASIZING RADIO BEAMS FROM BASE STATIONS

BACKGROUND

An earth station is a terrestrial radio station designed for extraplanetary telecommunication with spacecraft or for reception of radio waves from astronomical radio sources. A strict out-of-band emission (OOBE) is defined to protect incumbent earth station operation in a particular range (e.g., about a 4 to 4.2 gigahertz (GHz) range).

DETAILED DESCRIPTION OF PREFERRED EMBODIMENTS

Figure 1A:
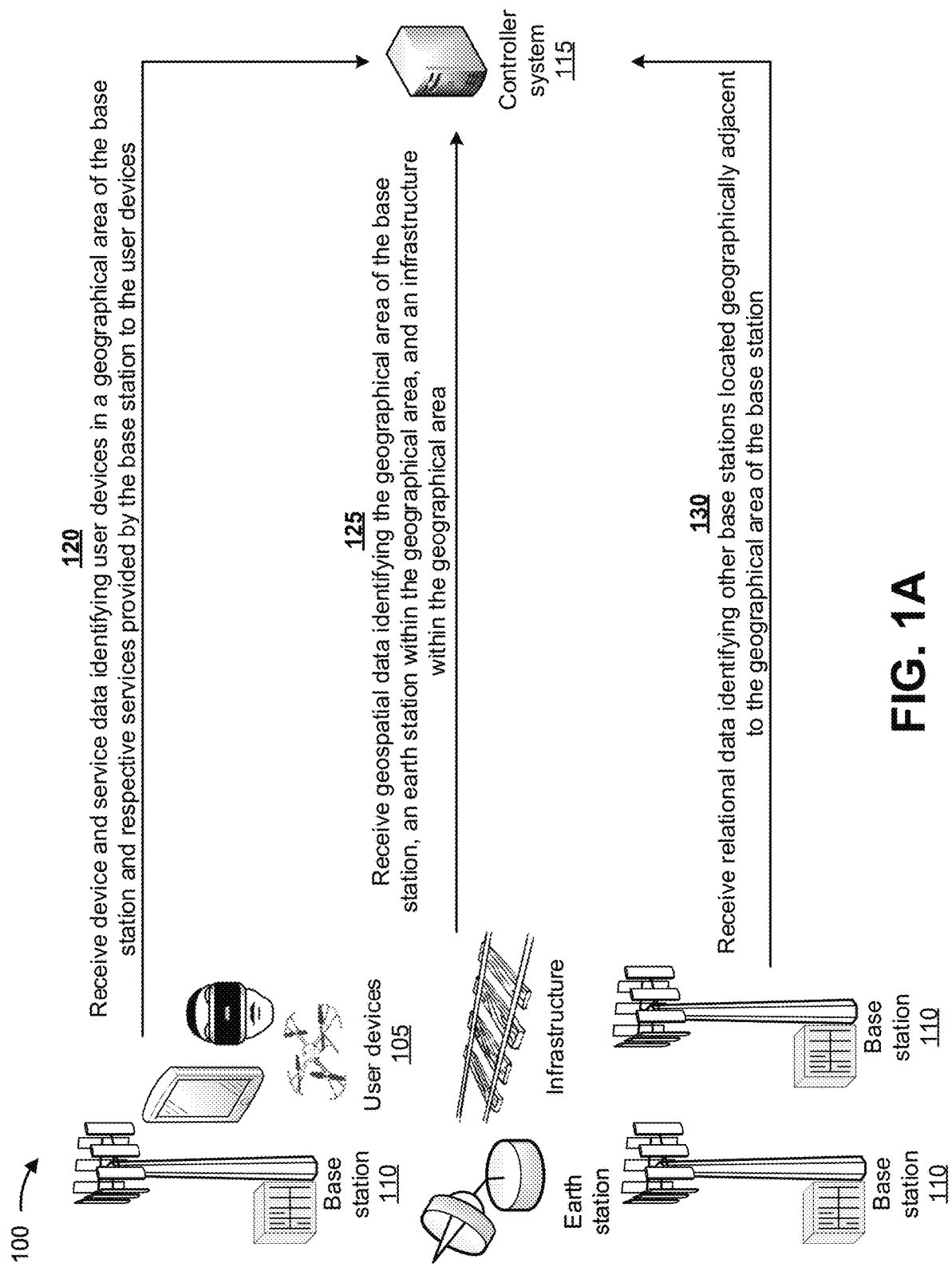
FIGS. 1A-1G are diagrams of one or more example implementations described herein.

The following detailed description of example implementations refers to the accompanying drawings. The same reference numbers in different drawings may identify the same or similar elements.

A base station of a radio access network (RAN) may include multiple tools for limiting OOBE to an earth station, such as reducing power, adjusting antenna tilt, and/or the like. However, a user device transmitting to the base station (e.g., on an uplink) creates unique challenges associated with OOBE to the earth station. A guard frequency band (e.g., of 20 megahertz (MHz)) may be provided between a fifth generation (5G) frequency band (e.g., 3,700 MHz to 3,980 MHz) generated by the base station and a frequency band (e.g., 4,000 MHz to 4,200 MHz) generated by the earth station. Unfortunately, the guard frequency band insufficiently protects the earth station from the user device located near the earth station and transmitting to the base station. Furthermore, the base station of the RAN does not include any mechanisms to manage beams generated by the base station for specific functions, such as drones, user devices located on trains, autonomous vehicles, and/or the like. This, in turn, wastes computing resources (e.g., processing resources, memory resources, communication resources, and/or the like), networking resources, and/or the like associated with the user device and the earth station creating interference and not operating correctly, correcting the interference between the user device and the earth station, attempting to retrieve data not received due to the interference, losing communication with mobile user devices (e.g., drones, user devices located on trains, and autonomous vehicles), and/or the like.

Some implementations described herein provide a controller system that emphasizes and deemphasizes radio beams from base stations. For example, the controller system may receive device and service data identifying user devices within a geographical area of a base station and respective services provided by the base station to the user devices, and may receive geospatial data identifying the geographical area of the base station, an earth station within the geographical area of the base station, and an infrastructure within the geographical area of the base station. The controller system may receive relational data identifying other base stations located geographically adjacent to the geographical area of the base station, and may determine, based on the device and service data, the geospatial data, and the relational data, interfering beams of the base station that interfere with the earth station. The controller system may include device data identifying the interfering beams, in a first list of beams to be deemphasized, and may determine, based on the device and service data, the geospatial data, and the relational data, beams of the base station to be emphasized based on the infrastructure within the geographical area of the base station. The controller system may include data identifying the beams to be emphasized, in a second list, and may control the base station based on the first list of the beams to be deemphasized and the second list of the beams to be emphasized.

In this way, the controller system emphasizes and deemphasizes radio beams from base stations. The controller system may determine beams to emphasize based on dynamic context data, such as a data identifying drone traffic, user device traffic associated with high-speed travel, such as a high speed train, autonomous vehicle traffic, and/or the like. The controller system may determine beams to deemphasize based on static context data, such as data identifying earth stations, geographical locations of the earth stations, and/or the like. Thus, the controller system conserves computing resources, networking resources, and/or the like that would otherwise have been wasted in incorrect operation of the user device and the earth station due to interference, correcting the interference between the user device and the earth station, attempting to retrieve data not received due to the interference, losing communication with mobile user devices (e.g., drones, user devices located on trains, and autonomous vehicles), and/or the like.

FIGS. 1A-1G are diagrams of one or more example implementations 100 associated with emphasizing and deemphasizing radio beams from base stations. As shown in FIGS. 1A-1G, example implementations 100 include user devices 105, base stations 110, and a controller system 115. User device 105 may include a mobile phone, a laptop computer, a tablet computer, a drone, an autonomous vehicle, and/or the like. Base station 110 may include a base transceiver station, a radio base station, an eNodeB, a gNodeB, and/or the like with radio transmitters, antennas, and/or the like. Controller system 115 may include a system that emphasizes and deemphasizes radio beams from base stations 110.

As further shown in FIG. 1A, one or more base stations 110 may be associated with an earth station and infrastructure. The earth station may include a terrestrial radio station designed for extraplanetary telecommunication with spacecraft or for reception of radio waves from astronomical radio sources. The infrastructure may include railroad tracks for high-speed trains, highways for autonomous vehicles and non-autonomous vehicles, roadways within cities, tracks for subway trains, and/or the like.

As further shown in FIG. 1A, and by reference number 120, controller system 115 may receive, from base station 110, device and service data identifying user devices 105 in a geographical area of base station 110 and respective services provided by base station 110 to the user devices 105. In some implementations, the device and service data are received for a particular time period (e.g., in minutes, hours, days, and/or the like), are aggregated across automatically determined time periods of significant communication traffic between user devices 105 and base station 110, and/or the like. The device and service data may include data identifying classes of user devices 105 (e.g., mobile phones, drones, robots, autonomous vehicles, and/or the like); classes of services offered by base station 110 to user devices 105 (e.g., voice services, video services, augmented reality services, virtual reality services, and/or the like); heuristics (e.g., a quantity of user devices 105 that have utilized base station 110); performance indicators (e.g., mobility of each of user devices 105, a quality of signaling provided by base station 110, a coverage provided by base station 110, a capacity of base station 110, and/or the like); types of mobility (e.g., low, medium, or high); locations of user devices 105 (e.g., indoor or outdoor); and/or the like.

As further shown in FIG. 1A, and by reference number 125, controller system 115 may receive geospatial data identifying the geographical area of base station 110, an earth station within the geographical area, and an infrastructure within the geographical area. The geospatial data may include data identifying static structures associated with base station 110, such as the earth station, the infrastructure, and/or the like; global navigation satellite system (GNSS) coordinates associated with the geographical area, such as GNSS coordinates of base station 110, the earth station, the infrastructure, and/or the like; known sources of external interference for base station 110; geographical contours of the geographical area; and/or the like.

As further shown in FIG. 1A, and by reference number 130, controller system 115 may receive relational data identifying other base stations 110 located geographically adjacent to the geographical area of base station 110. The relational data may include data identifying geographical distances between base station 110 and the other base stations 110; ranges of beams generated by the other base stations 110 in relation to base station 110; handover mobility statistics associated with base station 110 relative to the other base stations 110; mobility of user devices 105 associated with the other base stations 110; classes of user devices 105 associated with the other base stations 110; infrastructure associated with base station 110 and the other base stations 110; and/or the like.

Figure 1B:
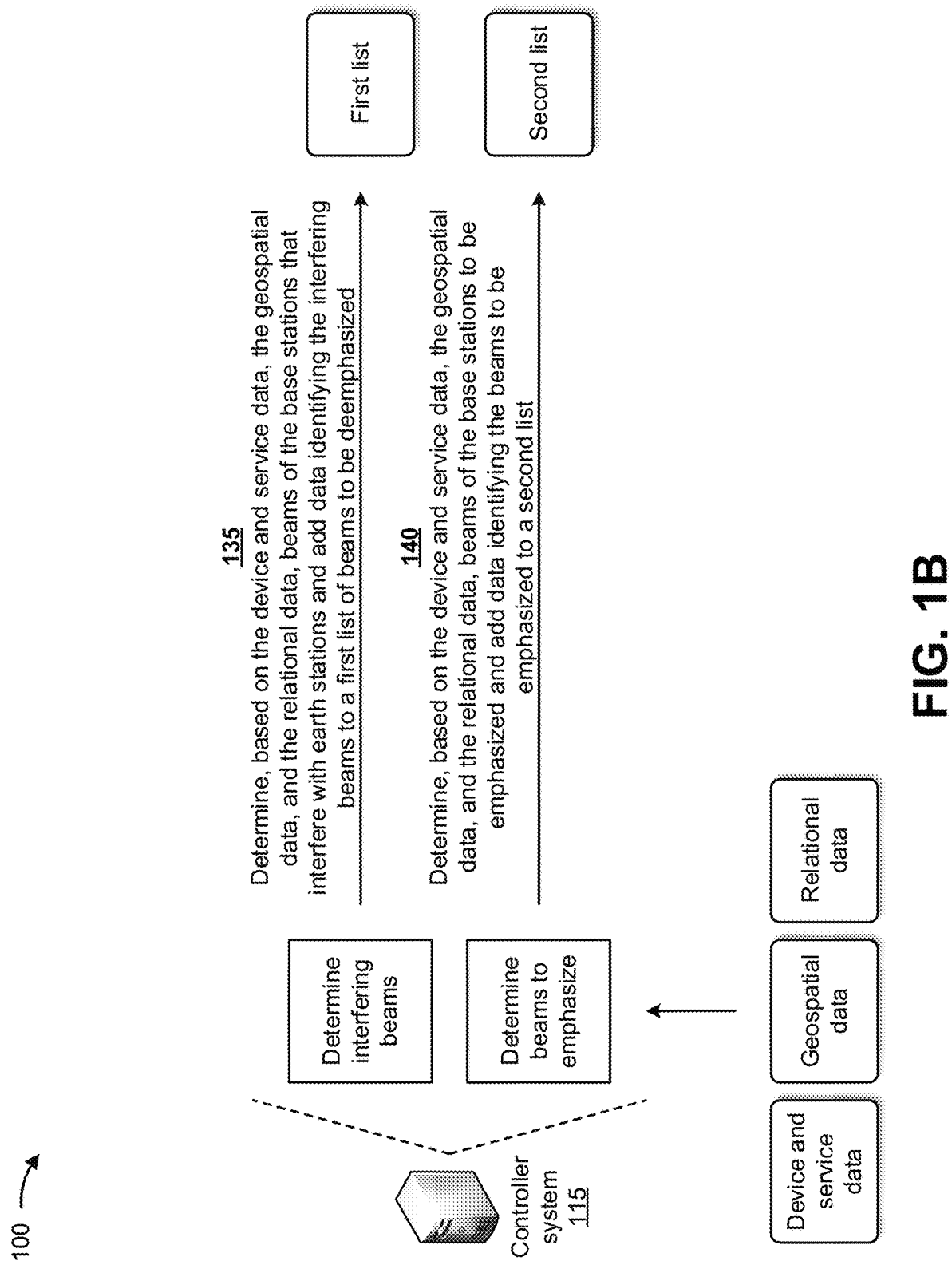

As shown in FIG. 1B, and by reference number 135, controller system 115 may determine, based on the device and service data, the geospatial data, and the relational data, beams of base stations 110 that interfere with earth stations, and may add data identifying the interfering beams to a first list of beams to be deemphasized. For example, controller system 115 may determine, based on the device and service data, the geospatial data, and the relational data, beams of base station 110 (e.g., associated with user devices 105 in FIG. 1A) that interfere with the earth station. Controller system 115 may determine pathloss-normalized distances (e.g., $a_1, a_2, a_3, \ldots, a_n$) between antennas of base station 110 and a location of the earth station, and may determine spacings (e.g., $x_1, x_2, x_3, \ldots, x_{n-1}$) between the antennas of base station 110. Controller system 115 may calculate a geometric angle (θ) as follows:

$$\theta = Avg\left[\arccos\frac{(a_i^2 - a_j^2 - x_i^2)}{2a_i x_j}\right].$$

Controller system 115 may determine that beams of base station 110 at the geometric angle (θ), with respect to a center beam generated by base station 110, interfere with signaling of the earth station. Controller system 115 may determine that the interfering beams of base station 110 are to be deemphasized and/or eliminated to prevent interference with the earth station. Controller system 115 may add data identifying the interfering beams of base station 110 to the first list of beams to be deemphasized.

As further shown in FIG. 1B, and by reference number 140, controller system 115 may determine, based on the device and service data, the geospatial data, and the relational data, beams of base stations 110 to be emphasized, and may add data identifying the beams to be emphasized to a second list. For example, controller system 115 may determine, based on the device and service data, the geospatial data, and the relational data, beams of base station 110 (e.g., associated with user devices 105 in FIG. 1A) to be emphasized. Controller system 115 may identify the beams of base station 110 to be emphasized as beams that enable advanced feature sets for user devices 105, such as enhanced intercell interference coordination (eICIC) with other base stations 110 and downlink and uplink coordinated multipoint (CoMP) to enable high mobility radio performance enhancements; beams that improve quality of service (QoS) for user devices 105 such as drones, user devices 105 located on high-speed trains, and autonomous vehicles; and/or the like. Controller system 115 may add data identifying the beams to be emphasized to the second list.

Figure 1C:
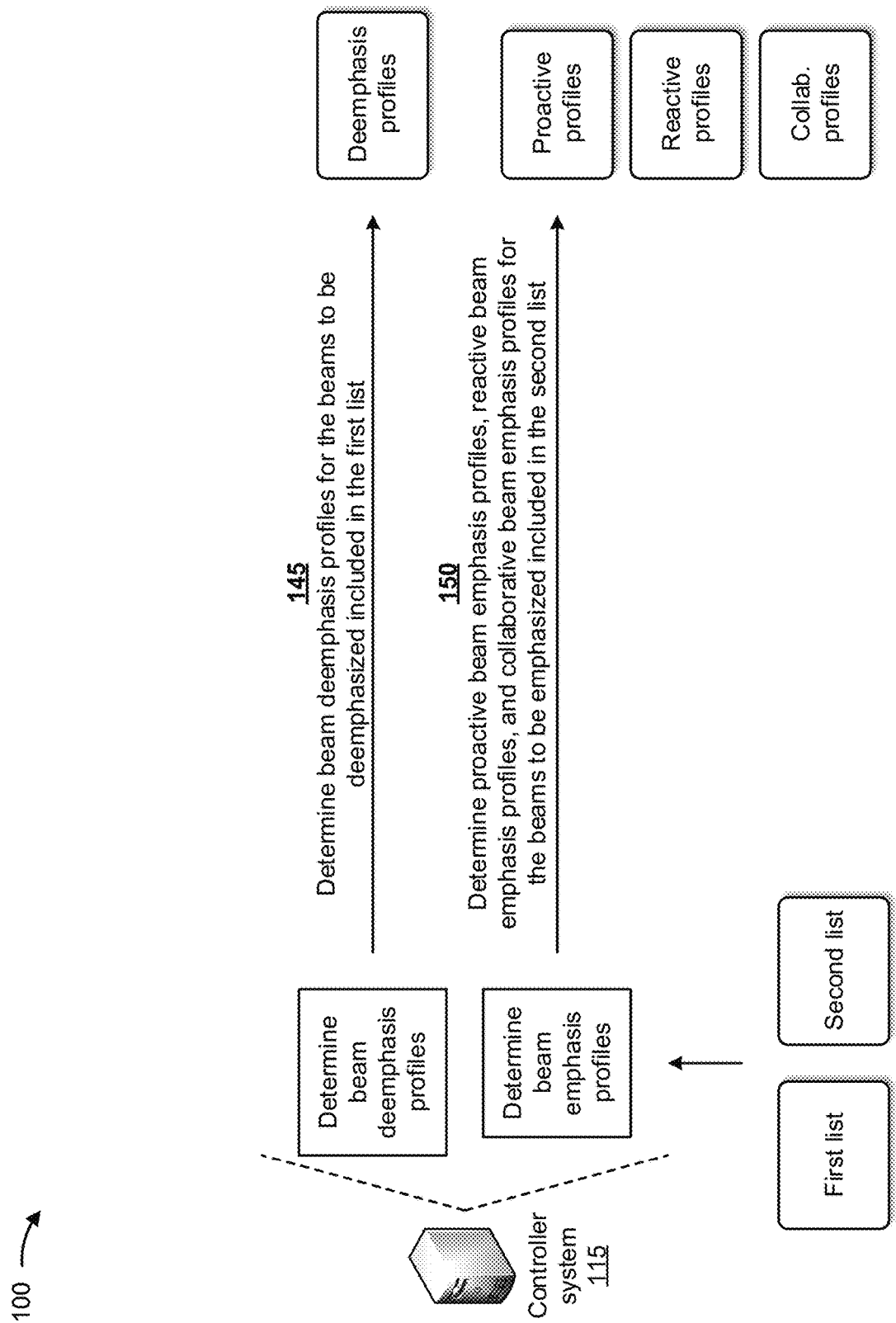

As shown in FIG. 1C, and by reference number 145, controller system 115 may determine (e.g., based on historical beam profiles or a priori beam profiles) beam deemphasis profiles for the beams to be deemphasized included in the first list. In some implementations, the beam deemphasis profiles include a profile, for each of the beams to be deemphasized, that indicates whether the beam is to be eliminated, whether the beam is to be reduced in width, whether a strength of the beam is to be reduced, whether an angle of the beam is to be modified, and/or the like, to prevent or reduce interference with the earth station. Controller system 115 may determine the beam deemphasis profiles based on distances between the earth station and antennas of base station 110 associated with the beams to be deemphasized, widths of the beams to be deemphasized, strengths of the beams to be deemphasized, angles of the beams to be deemphasized, and/or the like.

As further shown in FIG. 1C, and by reference number 150, controller system 115 may determine (e.g., based on historical beam profiles or a priori beam profiles) proactive beam emphasis profiles, reactive beam emphasis profiles, and collaborative beam emphasis profiles for the beams to be emphasized included in the second list. In some implementations, the proactive beam emphasis profiles include a profile, for each of the beams to be emphasized, that indicates whether the beam is to be increased in width, whether a strength of the beam is to be increased, whether an angle of the beam is to be modified, and/or the like, to proactively emphasize the beams for known future conditions (e.g., arrival of high-speed train near base station 110, arrival of an autonomous vehicle or a drone near base station 110, and/or the like). The proactive beam emphasis profiles may be determined for a time period (e.g., based on the known future conditions), for multiple beams of base station 110 to be emphasized, for each of the beams to be emphasized, and/or the like. Controller system 115 may determine the proactive beam emphasis profiles based on distances between user devices 105 (e.g., located on a high-speed train) and antennas of base station 110 associated with the beams to be emphasized, widths of the beams to be emphasized, strengths of the beams to be emphasized, angles of the beams to be emphasized, and/or the like. Controller system 115 may also determine triggers to switch from utilization of the proactive beam emphasis profiles to utilization of the reactive beam emphasis profiles and/or the collaborative beam emphasis profiles (e.g., when such profiles are required due to changing conditions).

In some implementations, the reactive beam emphasis profiles include a profile, for each of the beams to be emphasized, that indicates whether the beam is to be increased in width, whether a strength of the beam is to be increased, whether an angle of the beam is to be modified, and/or the like, to reactively emphasize the beams for current conditions (e.g., an unexpected arrival of an autonomous vehicle or a drone near base station 110, an expected change in a speed of a high-speed train, and/or the like). The reactive beam emphasis profiles may be determined for a trigger condition (e.g., an unexpected arrival of a drone near base station 110), for multiple beams of base station 110 to be emphasized, for each of the beams to be emphasized, and/or the like. Controller system 115 may determine the reactive beam emphasis profiles based on distances between user devices 105 (e.g., unexpected autonomous vehicles) and antennas of base station 110 associated with the beams to be emphasized, widths of the beams to be emphasized, strengths of the beams to be emphasized, angles of the beams to be emphasized, and/or the like. Controller system 115 may also determine triggers to switch from utilization of the reactive beam emphasis profiles to utilization of the proactive beam emphasis profiles and/or the collaborative beam emphasis profiles (e.g., when such profiles are required due to changing conditions).

In some implementations, the collaborative beam emphasis profiles include a profile, for each of the beams to be emphasized, that indicates whether the beam is to be increased in width, whether a strength of the beam is to be increased, whether an angle of the beam is to be modified, and/or the like, to collaboratively emphasize the beams with beams of the other base stations 110 for current or future conditions (e.g., arrival of an autonomous vehicle or a drone near base station 110 and the other base stations 110, arrival of a high-speed train near base station 110 and the other base stations 110, and/or the like). The collaborative beam emphasis profiles may coordinate the beams of base station 110 and the other base stations 110 to ensure maximum coverage and QoS for user devices 105 (e.g., user devices 105 on high-speed trains, drones, and/or the like). The collaborative beam emphasis profiles may also enable features (e.g., eICIC, uplink and downlink CoMP) to maximize performance of base station 110. Controller system 115 may determine the collaborative beam emphasis profiles based on distances between user devices 105 and antennas of base station 110 and the other base stations 110 associated with the beams to be emphasized, widths of the beams to be emphasized, strengths of the beams to be emphasized, angles of the beams to be emphasized, and/or the like.

In some implementations, controller system 115 may determine beam deemphasis profiles, proactive beam emphasis profiles, reactive beam emphasis profiles, and collaborative beam emphasis profiles for all of the beams generated by base station 110 and/or the other base stations 110.

Figure 1D:
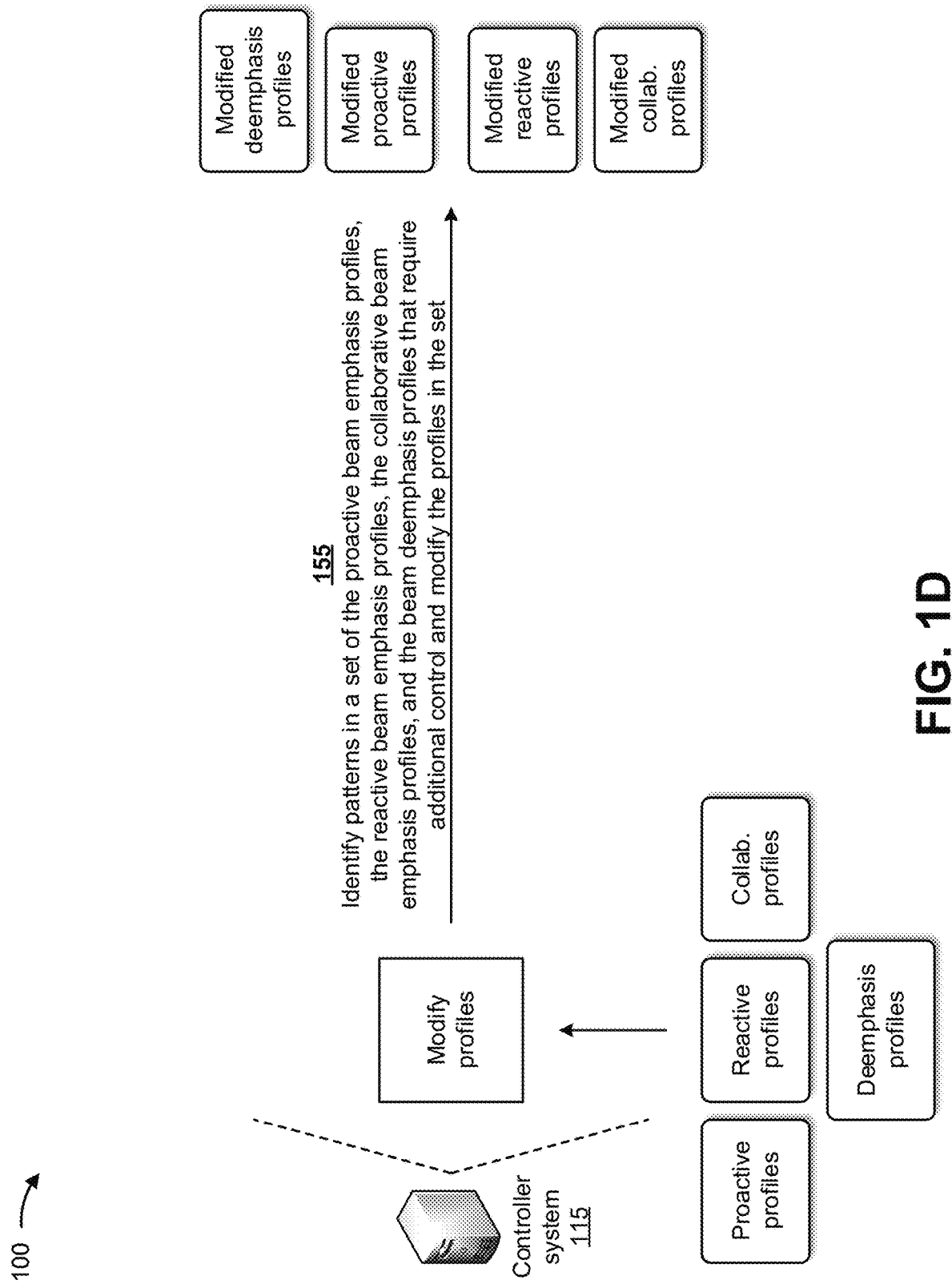

As shown in FIG. 1D, and by reference number 155, controller system 115 may identify patterns in a set of the proactive beam emphasis profiles, the reactive beam emphasis profiles, the collaborative beam emphasis profiles, and the beam deemphasis profiles that require additional control, and may modify the profiles in the set to generate a set of modified proactive beam emphasis profiles, modified reactive beam emphasis profiles, modified collaborative beam emphasis profiles, and modified beam deemphasis profiles. In some implementations, controller system 115 identifies, as the patterns in the set of the proactive beam emphasis profiles, the reactive beam emphasis profiles, the collaborative beam emphasis profiles, and the beam deemphasis profiles, data indicating that the beams associated with the profiles in the set require near real-time control (e.g., within a time window of ten milliseconds (ms) to ten seconds). For example, if conditions associated with base station 110 are changing in near real-time (e.g., a set of drones may be approaching base station 110 from a particular direction), controller system 115 may identify such conditions as the patterns in the set of the profiles.

In some implementations, controller system 115 may modify the profiles in the set to generate the set of modified proactive beam emphasis profiles, modified reactive beam emphasis profiles, modified collaborative beam emphasis profiles, and modified beam deemphasis profiles by modifying one or more widths of one or more of the beams in the set of profiles, by modifying one or more strengths of one or more of the beams in the set of profiles, by modifying one or more angles of one or more of the beams in the set of profiles, and/or the like. For example, if the set of drones are approaching base station 110 from the particular direction, controller system 115 may modify profiles of beams of base station 110 that are oriented in the particular direction so that such beams may be controlled in near real-time. In some implementations, controller system 115 may modify the profiles in the set by relying more on the reactive beam emphasis profiles than the proactive beam emphasis profiles (e.g., by weighting the reactive beam emphasis profiles more than the proactive beam emphasis profiles).

Figure 1E:
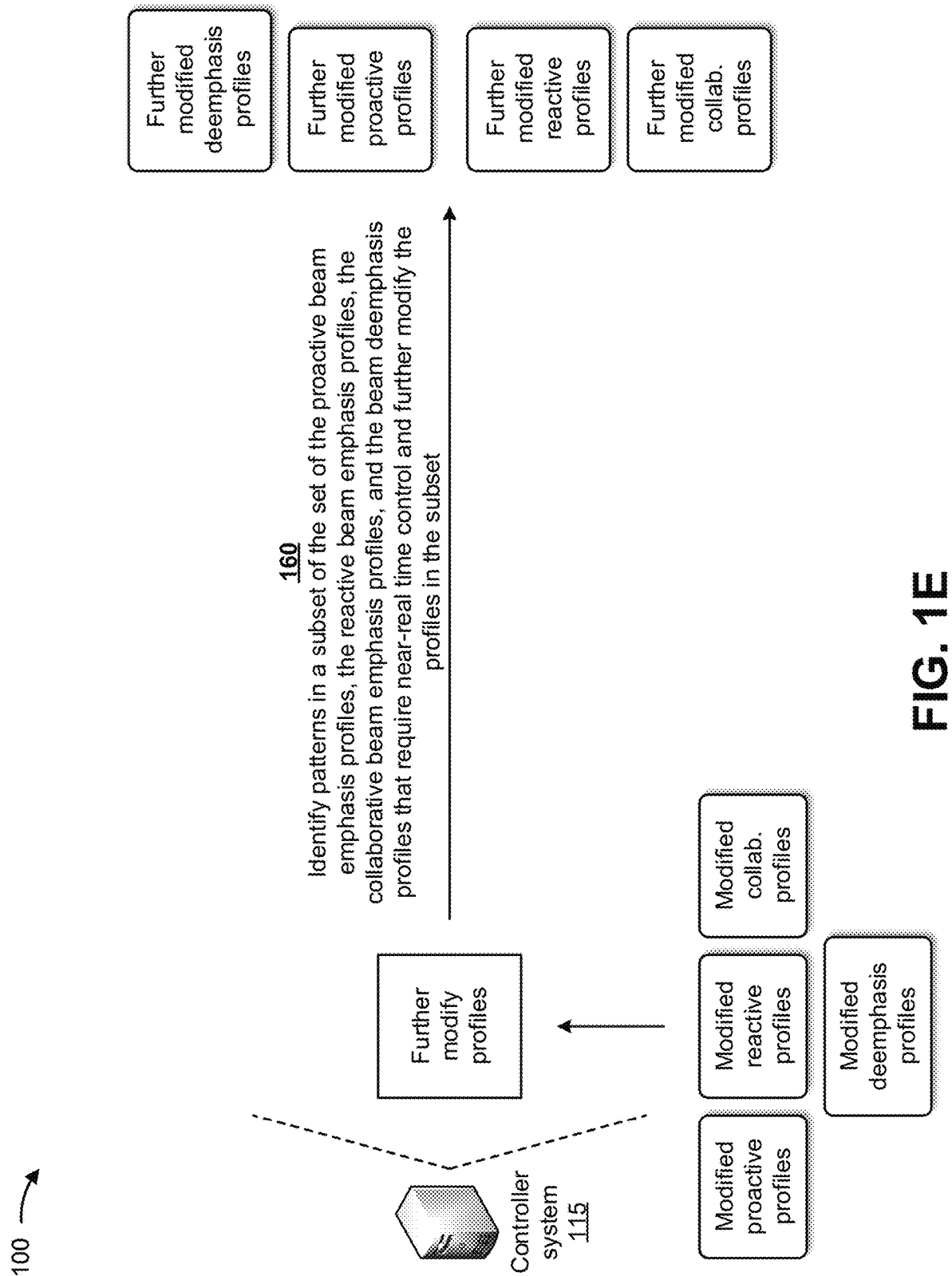

As shown in FIG. 1E, and by reference number 160, controller system 115 may identify patterns in a subset of the set of the proactive beam emphasis profiles, the reactive beam emphasis profiles, the collaborative beam emphasis profiles, and the beam deemphasis profiles that require additional control, and may further modify the profiles in the subset to generate a subset of further modified proactive beam emphasis profiles, further modified reactive beam emphasis profiles, further modified collaborative beam emphasis profiles, and further modified beam deemphasis profiles. In some implementations, controller system 115 identifies, as the patterns in the subset of the set of the proactive beam emphasis profiles, the reactive beam emphasis profiles, the collaborative beam emphasis profiles, and the beam deemphasis profiles, data indicating that the beams associated with the profiles in the set require real time control (e.g., within a time window of less than ten milliseconds). For example, if conditions associated with base station 110 are changing in real time (e.g., weather conditions around base station 110 are changing rapidly), controller system 115 may identify such conditions as the patterns in the subset of the set of the profiles.

In some implementations, controller system 115 may modify the profiles in the subset to generate the subset of further modified proactive beam emphasis profiles, further modified reactive beam emphasis profiles, further modified collaborative beam emphasis profiles, and further modified beam deemphasis profiles by modifying one or more widths of one or more of the beams in the subset of profiles, by modifying one or more strengths of one or more of the beams in the subset of profiles, by modifying one or more angles of one or more of the beams in the subset of profiles, and/or the like. For example, if wind conditions are changing rapidly around base station 110, controller system 115 may modify profiles of beams of base station 110 that are affected by the wind conditions so that such beams may be controlled in real time. In some implementations, controller system 115 may modify the profiles in the subset by relying even more on the reactive beam emphasis profiles than the proactive beam emphasis profiles (e.g., by weighting the reactive beam emphasis profiles even more than the proactive beam emphasis profiles).

Figure 1F:
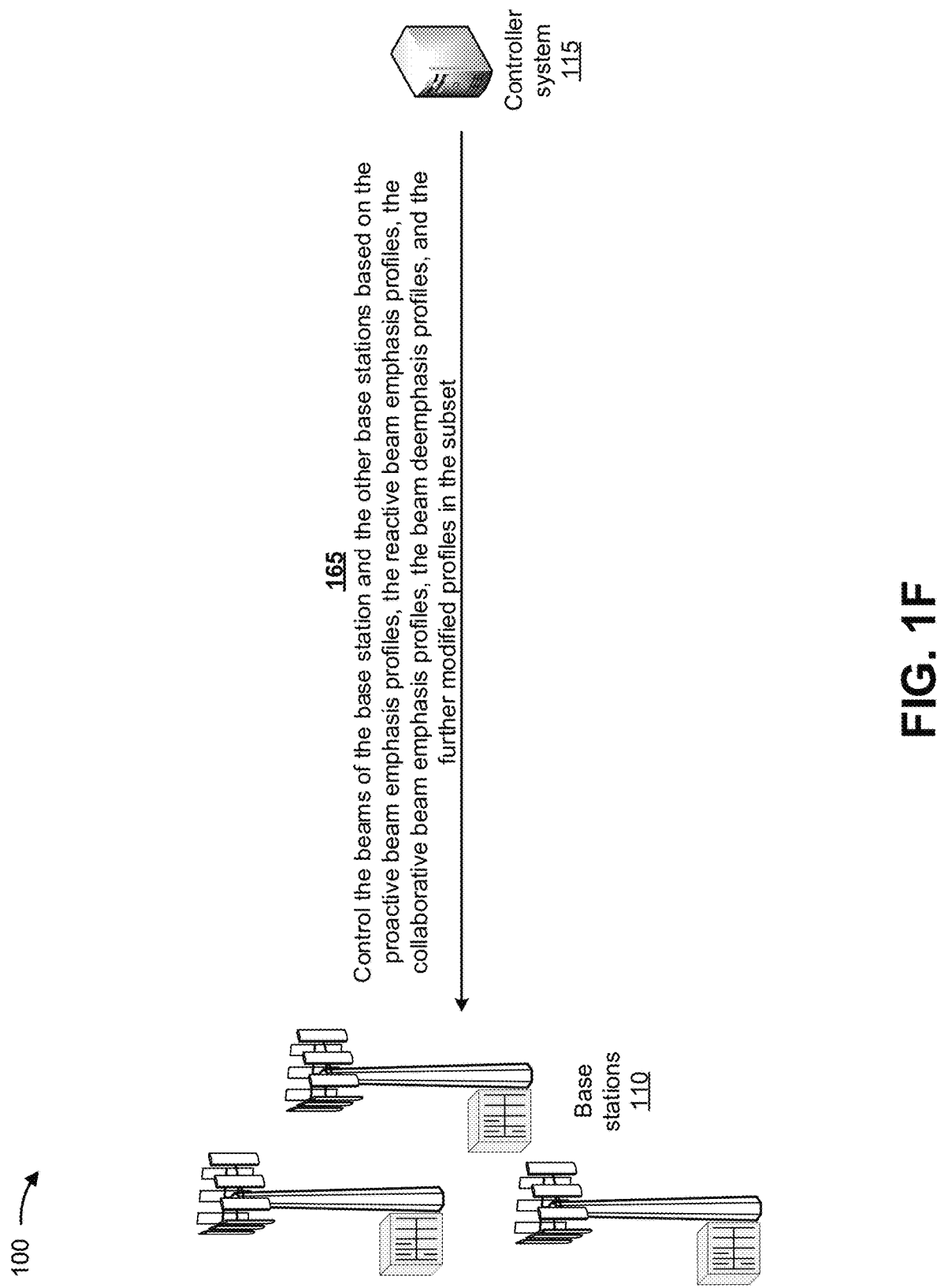

As shown in FIG. 1F, and by reference number 165, controller system 115 may control the beams of base station 110 and the other base stations 110 based on the proactive beam emphasis profiles, the reactive beam emphasis profiles, the collaborative beam emphasis profiles, and/or the beam deemphasis profiles. For example, controller system 115 may control the beams of base station 110 based on the proactive beam emphasis profiles by proactively controlling widths of the beams, proactively controlling strengths of the beams, by proactively controlling angles of the beams, and/or the like. Controller system 115 may control the beams of base station 110 based on the reactive beam emphasis profiles by reactively controlling widths of the beams, reactively controlling strengths of the beams, by reactively controlling angles of the beams, and/or the like. Controller system 115 may control the beams of base station 110 and the other base stations 110 based on the collaborative beam emphasis profiles by collaboratively controlling widths of the beams, by collaboratively controlling strengths of the beams, by collaboratively controlling angles of the beams, and/or the like. Controller system 115 may control the beams of base station 110 based on beam deemphasis profiles by eliminating or reducing widths of the beams to be deemphasized, by eliminating or reducing strengths of the beams to be deemphasized, by modifying angles of the beams to be deemphasized, and/or the like.

In some implementations, controller system 115 may control the beams of base station 110 and the other base stations 110 based on the modified proactive beam emphasis profiles, the modified reactive beam emphasis profiles, the modified collaborative beam emphasis profiles, the modified beam deemphasis profiles, the further modified proactive beam emphasis profiles, the further modified reactive beam emphasis profiles, the further modified collaborative beam emphasis profiles, and/or the further modified beam deemphasis profiles in a similar manner.

In some implementations, controller system 115 may control the beams of base station 110 based on the first list of the beams to be deemphasized and the second list of the beams to be emphasized. For example, controller system 115 may deemphasize the beams of base station 110 included on the first list to prevent base station 110 from interfering with signaling of the earth station. Controller system 115 may also emphasis the beams of base station 110 included on the second list to enable features (e.g., eICIC, uplink and downlink CoMP) that maximize performance of base station 110 for user devices 105.

Figure 1G:
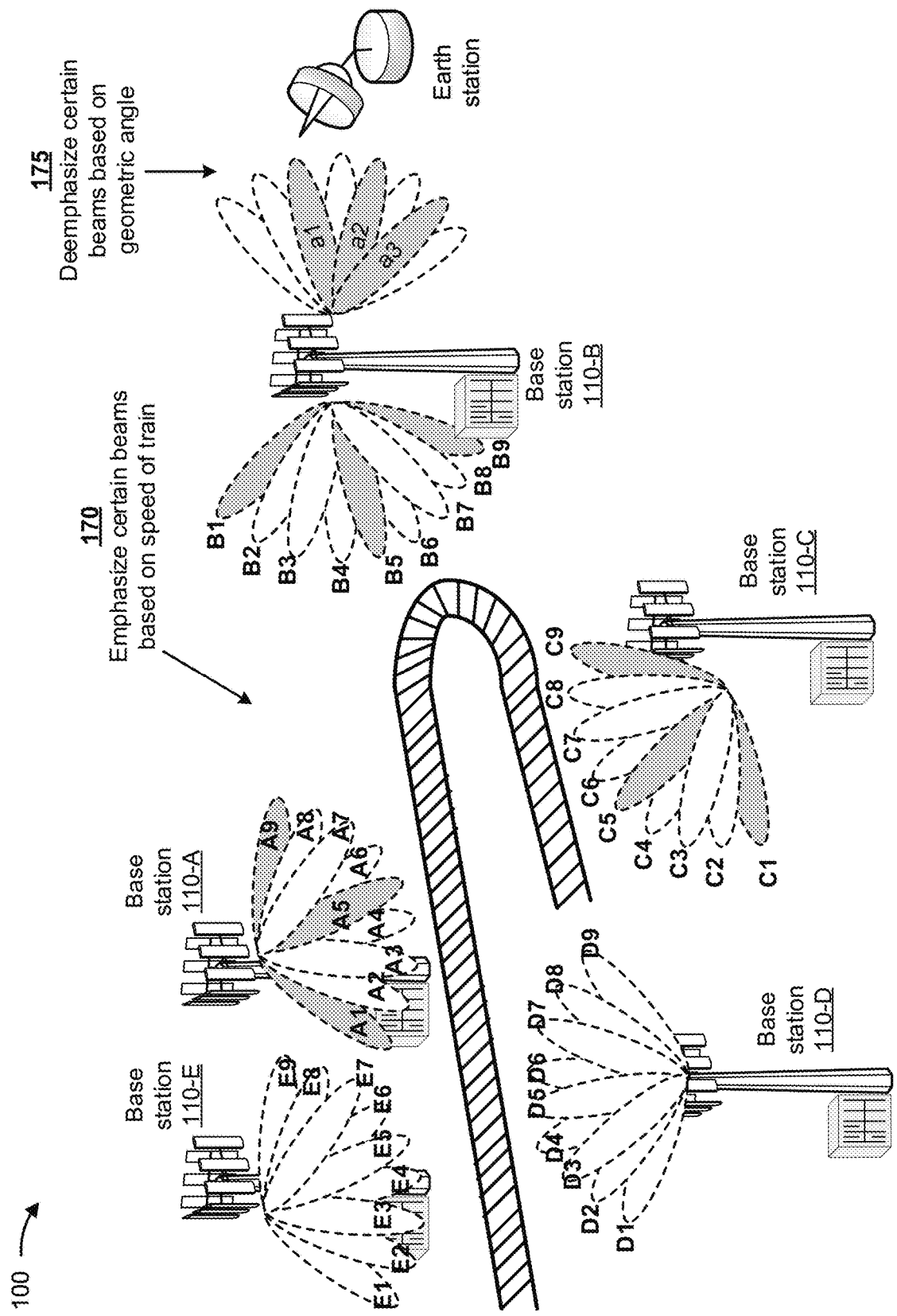

As shown in FIG. 1G, base stations 110-A through 110-E may be located near a railroad track associated with a high-speed train (e.g., containing multiple user devices 105), and base station 110-B may be located near the earth station. As further shown in FIG. 1G, and by reference number 170, base stations 110-A through 110-E may emphasize certain beams based on a speed of the high-speed train. For example, controller system 115 may define a set of beams, of base stations 110-A through 110-E, to be emphasized for each segment of the railroad track. Depending on a speed of the train, the beams to be emphasized may include beams A1, A5, and A9 (e.g., generated by base station 110-A), beams B1, B5, and B9 (e.g., generated by base station 110-B), and beams C9, C5, and C1 (e.g., generated by base station 110-C). Alternatively, the beams to be emphasized (e.g., in order) may include beams A1, A2, A3, A4, A5, A6, A7, A8, A9, B1, B2, B3, B4, B5, B6, B7, B8, B9, C9, C8, C7, C6, C5, C4, C3, C2, and C1. If the direction of the train is switched, the beams to be emphasized may include beams C1, C5, and C9 (e.g., generated by base station 110-C), beams B9, B5, and B1 (e.g., generated by base station 110-B), and beams A9, A5, and A1 (e.g., generated by base station 110-A). Controller system 115 may enable collaboration, based on the relational data, between beams E9 and A1, and beams D1 and A1, to enable improved coverage and QoS for user devices 105 located on the train, with reduced interference due to features, such as eICIC, downlink and uplink CoMP, and/or the like.

As further shown in FIG. 1G, and by reference number 175, base station 110-B may deemphasize certain beams based on a geometric angle (e.g., angle $\theta$, as described above in connection with FIG. 1B) to prevent interference with the earth station. For example, base station 110-B may deemphasize or eliminate beams at the geometric angle, with respect to a center beam generated by base station 110-B, to prevent interference with the earth station.

In this way, controller system 115 emphasizes and deemphasizes radio beams from base stations 110. Controller system 115 may determine beams to emphasize based on dynamic context data identifying mobile user devices 105, such as drones, user devices 105 located on high-speed trains, autonomous vehicles, and/or the like. Controller system 115 may determine beams to deemphasize based on static context data identifying static objects that may be interfered with, such as earth stations, and/or the like. Thus, controller system 115 conserves computing resources, networking resources, and/or the like that would otherwise have been wasted in incorrect operation of user device 105 and the earth station due to interference, correcting the interference between user device 105 and the earth station, attempting to retrieve data not received due to the interference, losing communication with mobile user devices 105 (e.g., drones, user devices 105 located on trains, and autonomous vehicles), and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
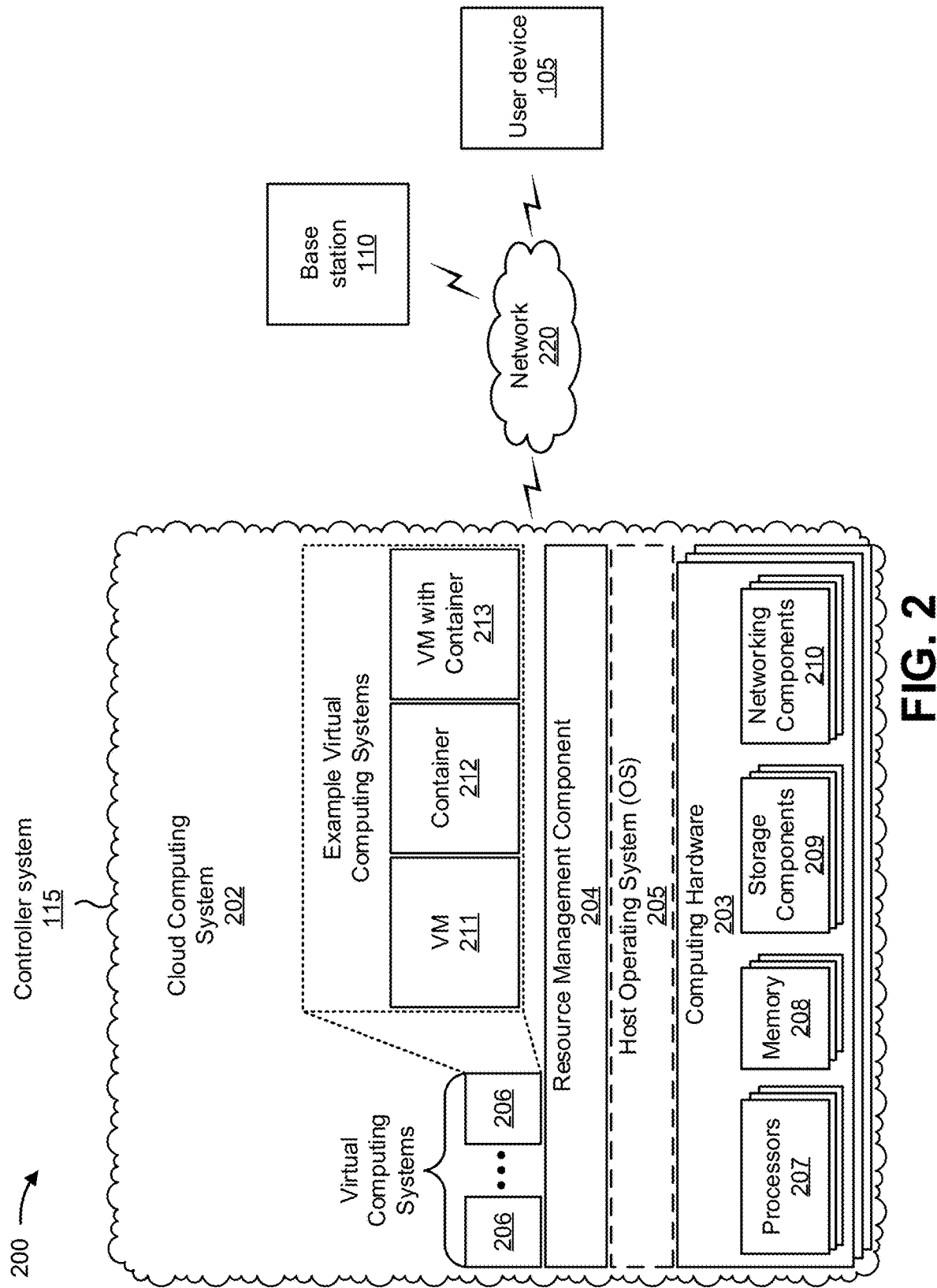
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include controller system 115, which may include one or more elements of and/or may execute within a cloud computing system 202. The cloud computing system 202 may include one or more elements 203-213, as described in more detail below. As further shown in FIG. 2, environment 200 may include user device 105, base station 110, and/or a network 220. Devices and/or elements of environment 200 may interconnect via wired connections and/or wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, a drone, an autonomous vehicle, or a similar type of device.

Base station 110 may support, for example, a cellular radio access technology (RAT). Base station 110 may include a base transceiver station, a radio base station, a node B, an eNodeB (eNB), a gNodeB (gNB), a base station subsystem, a cellular site, a cellular tower, an access point, a transmit receive point (TRP), a radio access node, a macrocell base station, a microcell base station, a picocell base station, a femtocell base station, or similar types of devices that may support wireless communication for user device 105. Base station 110 may transfer traffic between user device 105 (e.g., using a cellular RAT), one or more other base stations 110 (e.g., using a wireless interface or a backhaul interface, such as a wired backhaul interface), and/or a core network. Base station 110 may provide one or more cells that cover geographic areas.

In some implementations, base station 110 may perform scheduling and/or resource management for user device 105 covered by base station 110 (e.g., user device 105 covered by a cell provided by base station 110). In some implementations, base station 110 may be controlled or coordinated by a network controller, which may perform load balancing, network-level configuration, and/or the like. The network controller may communicate with base station 110 via a wireless or wireline backhaul. In some implementations, base station 110 may include a network controller, a self-organizing network (SON) module or component, or a similar module or component. In other words, base station 110 may perform network control, scheduling, and/or network management functions (e.g., for uplink, downlink, and/or sidelink communications of user device 105 covered by base station 110).

Cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the controller system 115 may include one or more elements 203-213 of the cloud computing system 202, may execute within the cloud computing system 202, and/or may be hosted within the cloud computing system 202, in some implementations, the controller system 115 may not be cloud-based (e.g., may be implemented outside of a cloud computing system) or may be partially cloud-based. For example, the controller system 115 may include one or more devices that are not part of the cloud computing system 202, such as device 300 of FIG. 3, which may include a stand-alone server or another type of computing device. The controller system 115 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
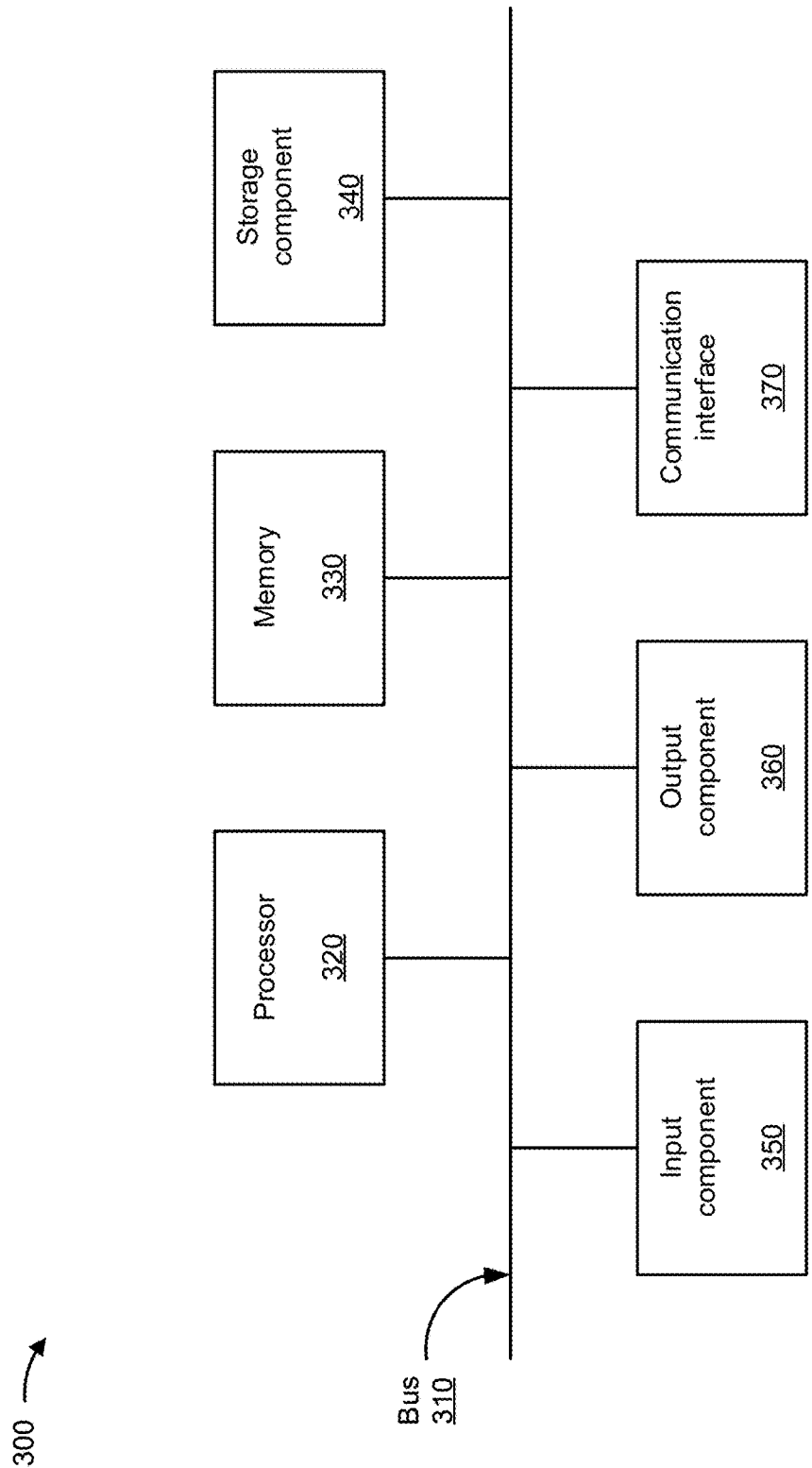
FIG. 3 is a diagram of example components of one or more devices of FIG. 2.

FIG. 3 is a diagram of example components of a device 300, which may correspond to user device 105, base station 110, and/or controller system 115. In some implementations, user device 105, base station 110, and/or controller system 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
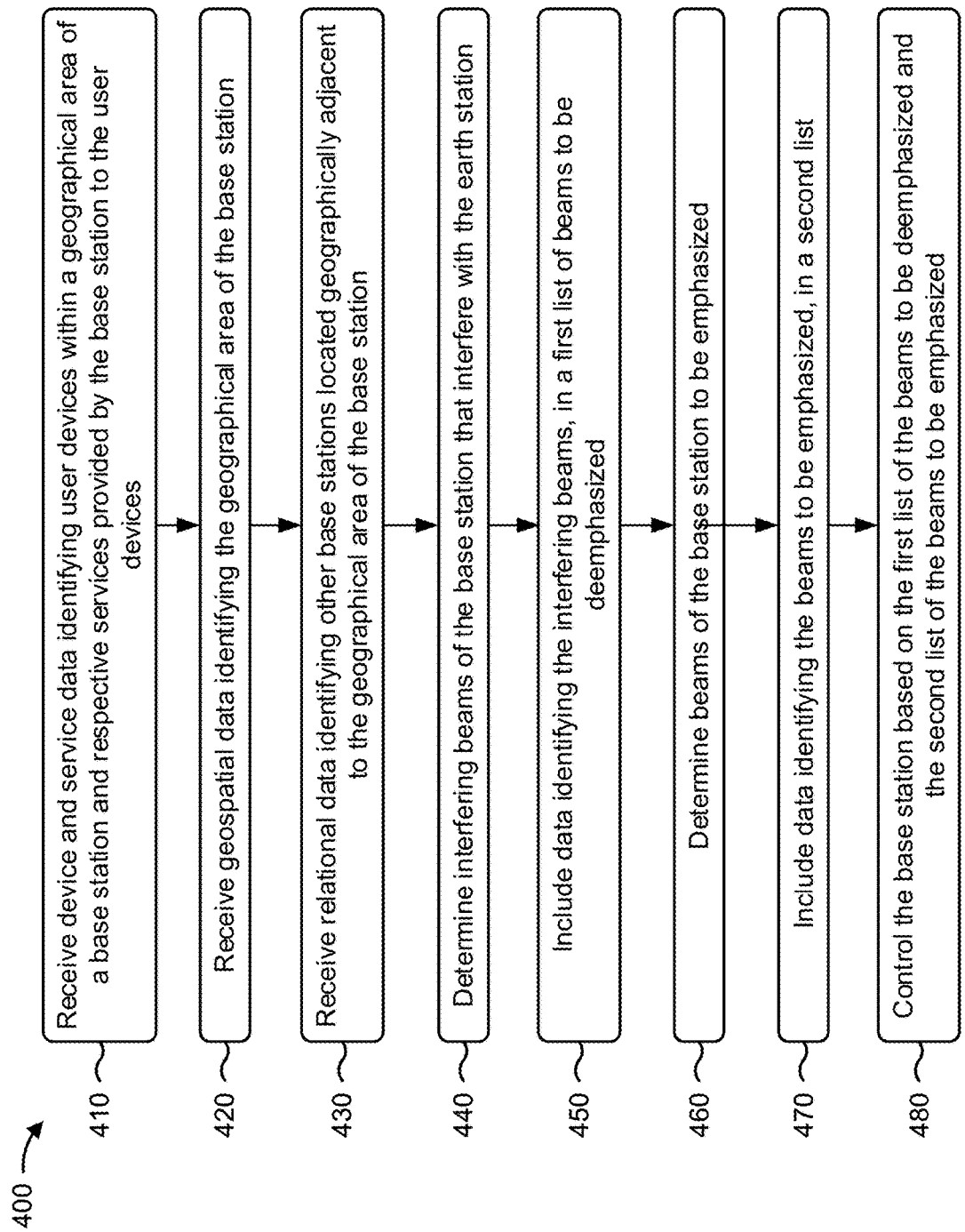
FIG. 4 is a flow chart of an example process for emphasizing and deemphasizing radio beams from base stations.

FIG. 4 is a flowchart of an example process 400 associated with emphasizing and deemphasizing radio beams from base stations. In some implementations, one or more process blocks of FIG. 4 may be performed by a device (e.g., controller system 115). In some implementations, one or more process blocks of FIG. 4 may be performed by another device or a group of devices separate from or including the device, such as user device 105 and/or base station 110. Additionally, or alternatively, one or more process blocks of FIG. 4 may be performed by one or more components of device 300, such as processor 320, memory 330, storage component 340, input component 350, output component 360, communication component 370, and/or the like.

As shown in FIG. 4, process 400 may include receiving device and service data identifying user devices within a geographical area of a base station and respective services provided by the base station to the user devices (block 410). For example, the device may receive device and service data identifying user devices within a geographical area of a base station and respective services provided by the base station to the user devices, as described above.

As further shown in FIG. 4, process 400 may include receiving geospatial data identifying the geographical area of the base station, an earth station within the geographical area of the base station, and an infrastructure within the geographical area of the base station (block 420). For example, the device may receive geospatial data identifying the geographical area of the base station, an earth station within the geographical area of the base station, and an infrastructure within the geographical area of the base station, as described above.

As further shown in FIG. 4, process 400 may include receiving relational data identifying other base stations located geographically adjacent to the geographical area of the base station (block 430). For example, the device may receive relational data identifying other base stations located geographically adjacent to the geographical area of the base station, as described above.

As further shown in FIG. 4, process 400 may include determining, based on the device and service data, the geospatial data, and the relational data, interfering beams of the base station that interfere with the earth station (block 440). For example, the device may determine, based on the device and service data, the geospatial data, and the relational data, interfering beams of the base station that interfere with the earth station, as described above.

As further shown in FIG. 4, process 400 may include including data identifying the interfering beams, in a first list of beams to be deemphasized (block 450). For example, the device may include data identifying the interfering beams, in a first list of beams to be deemphasized, as described above.

As further shown in FIG. 4, process 400 may include determining, based on the device and service data, the geospatial data, and the relational data, beams of the base station to be emphasized based on the infrastructure within the geographical area of the base station (block 460). For example, the device may determine, based on the device and service data, the geospatial data, and the relational data, beams of the base station to be emphasized based on the infrastructure within the geographical area of the base station, as described above.

As further shown in FIG. 4, process 400 may include including data identifying the beams to be emphasized, in a second list (block 470). For example, the device may include data identifying the beams to be emphasized, in a second list, as described above.

As further shown in FIG. 4, process 400 may include controlling the base station based on the first list of the beams to be deemphasized and the second list of the beams to be emphasized (block 480). For example, the device may control the base station based on the first list of the beams to be deemphasized and the second list of the beams to be emphasized, as described above.

Process 400 may include additional implementations, such as any single implementation or any combination of implementations described below and/or in connection with one or more other processes described elsewhere herein.

In a first implementation, controlling the base station based on the first list of the beams to be deemphasized and the second list of the beams to be emphasized includes causing the base station to reduce or eliminate the beams to be deemphasized to reduce interference with the earth station, and causing the base station to increase the beams to be emphasized to provide network coverage for the infrastructure.

In a second implementation, determining the interfering beams of the base station that interfere with the earth station includes determining the interfering beams of the base station based on a geometric angle with respect to a center beam of the base station.

In a third implementation, process 400 includes determining, based on historical beam profiles or a priori beam profiles, beam deemphasis profiles for the beams to be deemphasized included in the first list; determining, based on the historical beam profiles or the a priori beam profiles, proactive beam emphasis profiles, reactive beam emphasis profiles, and collaborative beam emphasis profiles for the beams to be emphasized included in the second list; and controlling the base station based on the beam deemphasis profiles, the proactive beam emphasis profiles, the reactive beam emphasis profiles, and the collaborative beam emphasis profiles.

In a fourth implementation, process 400 includes determining beam deemphasis profiles for the beams to be deemphasized included in the first list; determining proactive beam emphasis profiles, reactive beam emphasis profiles, and collaborative beam emphasis profiles for the beams to be emphasized included in the second list; and controlling the base station based on the beam deemphasis profiles, the proactive beam emphasis profiles, the reactive beam emphasis profiles, and the collaborative beam emphasis profiles.

In a fifth implementation, process 400 includes identifying patterns in a set of the proactive beam emphasis profiles, the reactive beam emphasis profiles, the collaborative beam emphasis profiles, and the beam deemphasis profiles that require additional beam control; modifying profiles in the set to generate modified proactive beam emphasis profiles, modified reactive beam emphasis profiles, modified collaborative beam emphasis profiles, and modified beam deemphasis profiles; and controlling the base station based on the modified proactive beam emphasis profiles, the modified reactive beam emphasis profiles, the modified collaborative beam emphasis profiles, and the modified beam deemphasis profiles.

In a sixth implementation, process 400 includes identifying additional patterns in a subset of the set of the proactive beam emphasis profiles, the reactive beam emphasis profiles, the collaborative beam emphasis profiles, and the beam deemphasis profiles that require near real-time beam control; further modifying profiles in the subset to generate further modified proactive beam emphasis profiles, further modified reactive beam emphasis profiles, further modified collaborative beam emphasis profiles, and further modified beam deemphasis profiles; and controlling the base station based on the further modified proactive beam emphasis profiles, the further modified reactive beam emphasis profiles, the further modified collaborative beam emphasis profiles, and the further modified beam deemphasis profiles.

In a seventh implementation, process 400 includes receiving feedback associated with controlling the base station based on the first list of the beams to be deemphasized and the second list of the beams to be emphasized; modifying the first list and the second list based on the feedback and to generate a modified first list and a modified second list; and controlling the base station based on the modified first list and the modified second list.

In an eighth implementation, process 400 includes determining proactive beam emphasis profiles for the beams to be emphasized included in the second list; determining reactive beam emphasis profiles for the beams to be emphasized included in the second list; determining collaborative beam emphasis profiles for the beams to be emphasized included in the second list; determining additional collaborative beam emphasis profiles, for beams of the other base stations, that are associated with the collaborative beam emphasis profiles; controlling the base station based on the proactive beam emphasis profiles, the reactive beam emphasis profiles, and the collaborative beam emphasis profiles; and controlling the other base stations based on the additional collaborative beam emphasis profiles.

In a ninth implementation, the collaborative beam emphasis profiles and the additional collaborative beam emphasis profiles enable the base station and the other base stations to provide network coverage for mobile user devices utilizing the infrastructure.

In a tenth implementation, the proactive beam emphasis profiles are associated with time windows for controlling beams of the base station, and the reactive beam emphasis profiles are associated with event triggers for controlling the beams of the base station.

In an eleventh implementation, process 400 includes causing the base station to shrink widths of the beams to be deemphasized to reduce interference with the earth station, and causing the base station to increase widths of the beams to be emphasized to provide network coverage for the infrastructure.

In a twelfth implementation, the device and service data includes data identifying classes of the user devices, classes of the respective services provided by the base station to the user devices, a quantity of user devices associated with the base station, key performance indicators associated with the base station, and/or a degree of mobility associated with the base station.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, device and service data identifying user devices within a geographical area of a base station and respective services provided by the base station to the user devices;
   receiving, by the device, geospatial data identifying the geographical area of the base station, an earth station within the geographical area of the base station, and an infrastructure within the geographical area of the base station;
   receiving, by the device, relational data identifying other base stations located geographically adjacent to the geographical area of the base station;
   determining, by the device and based on the device and service data, the geospatial data, and the relational data, interfering beams of the base station that interfere with the earth station;
   including, by the device, data identifying the interfering beams, in a first list of beams, to be deemphasized;
   determining, by the device and based on the device and service data, the geospatial data, and the relational data, beams of the base station, different from the interfering beams, to be emphasized based on the infrastructure within the geographical area of the base station;
   including, by the device, data identifying the beams to be emphasized in a second list of beams; and
   controlling, by the device, the base station based on the first list of the beams to be deemphasized and the second list of the beams to be emphasized.

2. The method of claim 1, wherein the controlling further comprises:
   causing the base station to reduce or eliminate the interfering beams to be deemphasized to reduce interference with the earth station; and
   causing the base station to increase the beams to be emphasized to provide network coverage for the infrastructure.

3. The method of claim 1, wherein determining the interfering beams of the base station that interfere with the earth station comprises:
   determining the interfering beams of the base station based on a geometric angle with respect to a center beam of the base station.

4. The method of claim 1, further comprising:
   determining, based on historical beam profiles or a priori beam profiles, beam deemphasis profiles for the interfering beams to be deemphasized included in the first list;
   determining, based on the historical beam profiles or the a priori beam profiles, proactive beam emphasis profiles, reactive beam emphasis profiles, and collaborative beam emphasis profiles for the beams to be emphasized included in the second list; and
   controlling the base station based on the beam deemphasis profiles, the proactive beam emphasis profiles, the reactive beam emphasis profiles, and the collaborative beam emphasis profiles.

5. The method of claim 1, further comprising:
   determining beam deemphasis profiles for the interfering beams to be deemphasized included in the first list;
   determining proactive beam emphasis profiles, reactive beam emphasis profiles, and collaborative beam emphasis profiles for the beams to be emphasized included in the second list; and
   controlling the base station based on the beam deemphasis profiles, the proactive beam emphasis profiles, the reactive beam emphasis profiles, and the collaborative beam emphasis profiles.

6. The method of claim 5, further comprising:
   identifying patterns in a set of the proactive beam emphasis profiles, the reactive beam emphasis profiles, the collaborative beam emphasis profiles, and the beam deemphasis profiles that require additional beam control;

modifying profiles in the set to generate modified proactive beam emphasis profiles, modified reactive beam emphasis profiles, modified collaborative beam emphasis profiles, and modified beam deemphasis profiles; and controlling the base station based on the modified proactive beam emphasis profiles, the modified reactive beam emphasis profiles, the modified collaborative beam emphasis profiles, and the modified beam deemphasis profiles.

7. The method of claim 6, further comprising:

identifying additional patterns in a subset of the set of the proactive beam emphasis profiles, the reactive beam emphasis profiles, the collaborative beam emphasis profiles, and the beam deemphasis profiles that require near real-time beam control;

further modifying profiles in the subset to generate further modified proactive beam emphasis profiles, further modified reactive beam emphasis profiles, further modified collaborative beam emphasis profiles, and further modified beam deemphasis profiles; and controlling the base station based on the further modified proactive beam emphasis profiles, the further modified reactive beam emphasis profiles, the further modified collaborative beam emphasis profiles, and the further modified beam deemphasis profiles.

8. A device, comprising:

one or more processors configured to:

receive device and service data identifying user devices in a geographical area of a base station and respective services provided by the base station to the user devices, wherein the base station includes a plurality of antennas to generate a corresponding plurality of beams;

receive geospatial data identifying the geographical area of the base station, an earth station within the geographical area of the base station, and an infrastructure within the geographical area of the base station;

receive relational data identifying other base stations located geographically adjacent to the geographical area of the base station;

determine, based on the device and service data, the geospatial data, and the relational data, interfering beams of the base station that interfere with the earth station;

include data identifying the interfering beams in a first list of beams to be deemphasized;

determine, based on the device and service data, the geospatial data, and the relational data, beams of the base station, different from the interfering beams, to be emphasized based on the infrastructure within the geographical area of the base station;

include data identifying the beams to be emphasized in a second list; and control the base station based on the first list of the beams to be deemphasized and the second list of the beams to be emphasized.

9. The device of claim 8, wherein the one or more processors are further configured to:

receive feedback associated with controlling the base station based on the first list of the beams to be deemphasized and the second list of the beams to be emphasized;

modify the first list and the second list based on the feedback and to generate a modified first list and a modified second list; and control the base station based on the modified first list and the modified second list.

10. The device of claim 8, wherein the one or more processors are further configured to:

determine proactive beam emphasis profiles for the beams to be emphasized included in the second list;

determine reactive beam emphasis profiles for the beams to be emphasized included in the second list;

determine collaborative beam emphasis profiles for the beams to be emphasized included in the second list;

determine additional collaborative beam emphasis profiles, for beams of the other base stations, that are associated with the collaborative beam emphasis profiles;

control the base station based on the proactive beam emphasis profiles, the reactive beam emphasis profiles, and the collaborative beam emphasis profiles; and control the other base stations based on the additional collaborative beam emphasis profiles.

11. The device of claim 10, wherein the collaborative beam emphasis profiles and the additional collaborative beam emphasis profiles enable the base station and the other base stations to provide network coverage for mobile user devices utilizing the infrastructure.

12. The device of claim 10, wherein the proactive beam emphasis profiles are associated with time windows for controlling beams of the base station, and wherein the reactive beam emphasis profiles are associated with event triggers for controlling the beams to be emphasized of the base station.

13. The device of claim 8, wherein the one or more processors, when controlling the base station based on the first list of the beams to be deemphasized and the second list of the beams to be emphasized, are configured to:

cause the base station to shrink widths of the interfering beams to be deemphasized to reduce interference with the earth station; and cause the base station to increase widths of the beams to be emphasized to provide network coverage for the infrastructure.

14. The device of claim 8, wherein the device and service data includes data identifying one or more of:

classes of the user devices, classes of the respective services provided by the base station to the user devices, a quantity of user devices associated with the base station, key performance indicators associated with the base station, or a degree of mobility associated with the base station.

15. A non-transitory computer-readable medium storing instructions, the instructions comprising:

one or more instructions that, when executed by one or more processors, cause the one or more processors to:

receive device and service data identifying user devices in a geographical area of a base station and respective services provided by the base station to the user devices;

receive geospatial data identifying the geographical area of the base station, an earth station within the geographical area of the base station, and an infrastructure within the geographical area of the base station;

receive relational data identifying other base stations located geographically adjacent to the geographical area of the base station;

determine, based on the device and service data, the geospatial data, and the relational data, interfering beams of the base station that interfere with the earth station;

include data identifying the interfering beams in a first list of beams to be deemphasized;

determine, based on the device and service data, the geospatial data, and the relational data, beams of the base station, different from the interfering beams, to be emphasized based on the infrastructure within the geographical area of the base station;

include data identifying the beams to be emphasized in a second list;

control the base station based on the first list of the beams to be deemphasized and the second list of the beams to be emphasized;

receive feedback associated with controlling the base station based on the first list of the beams to be deemphasized and the second list of the beams to be emphasized;

modify the first list and the second list based on the feedback and to generate a modified first list and a modified second list; and control the base station based on the modified first list and the modified second list.

16. The non-transitory computer-readable medium of claim 15, wherein the one or more instructions, that cause the one or more processors to control the base station based on the first list of the beams to be deemphasized and the second list of the beams to be emphasized, cause the one or more processors to:

cause the base station to reduce or eliminate the beams to be deemphasized to reduce interference with the earth station; and cause the base station to increase the beams to be emphasized to provide network coverage for the infrastructure.

17. The non-transitory computer-readable medium of claim 15, wherein the one or more instructions, that cause the one or more processors to determine the interfering beams of the base station that interfere with the earth station, cause the one or more processors to:

determine the interfering beams of the base station based on a geometric angle with respect to a center beam of the base station.

18. The non-transitory computer-readable medium of claim 15, wherein the one or more instructions, when executed by the one or more processors, further cause the one or more processors to:

determine beam deemphasis profiles for the beams to be deemphasized included in the first list;

determine proactive beam emphasis profiles, reactive beam emphasis profiles, and collaborative beam emphasis profiles for the beams to be emphasized included in the second list;

identify patterns in a set of the proactive beam emphasis profiles, the reactive beam emphasis profiles, the collaborative beam emphasis profiles, and the beam deemphasis profiles that require additional beam control;

modify profiles in the set to generate modified proactive beam emphasis profiles, modified reactive beam emphasis profiles, modified collaborative beam emphasis profiles, and modified beam deemphasis profiles; and control the base station based on the modified proactive beam emphasis profiles, the modified reactive beam emphasis profiles, the modified collaborative beam emphasis profiles, and the modified beam deemphasis profiles.

19. The non-transitory computer-readable medium of claim 15, wherein the one or more instructions, when executed by the one or more processors, further cause the one or more processors to:

determine proactive beam emphasis profiles for the beams to be emphasized included in the second list;

determine reactive beam emphasis profiles for the beams to be emphasized included in the second list;

determine collaborative beam emphasis profiles for the beams to be emphasized included in the second list;

determine additional collaborative beam emphasis profiles, for beams of the other base stations, that are associated with the collaborative beam emphasis profiles;

control the base station based on the proactive beam emphasis profiles, the reactive beam emphasis profiles, and the collaborative beam emphasis profiles; and control the other base stations based on the additional collaborative beam emphasis profiles.

20. The non-transitory computer-readable medium of claim 19, wherein the collaborative beam emphasis profiles and the additional collaborative beam emphasis profiles enable the base station and the other base stations to provide network coverage for mobile user devices utilizing the infrastructure, wherein the proactive beam emphasis profiles are associated with time windows for controlling beams of the base station, and wherein the reactive beam emphasis profiles are associated with event triggers for controlling the beams of the base station.

* * * * *